(12) United States Patent
Nappe

(10) Patent No.: US 11,345,839 B2
(45) Date of Patent: May 31, 2022

(54) EXPANDING AND DISPOSABLE OIL ABSORBENT PADS

(71) Applicant: Christopher Nappe, Riverhead, NY (US)

(72) Inventor: Christopher Nappe, Riverhead, NY (US)

( * ) Notice: Subject to any disclaimer, the term of this patent is extended or adjusted under 35 U.S.C. 154(b) by 800 days.

(21) Appl. No.: 16/009,170

(22) Filed: Jun. 14, 2018

(65) Prior Publication Data

US 2018/0362818 A1     Dec. 20, 2018

Related U.S. Application Data

(60) Provisional application No. 62/519,526, filed on Jun. 14, 2017.

(51) Int. Cl.
| | |
|---|---|
| *C09K 3/32* | (2006.01) |
| *B01J 20/04* | (2006.01) |
| *B01J 20/02* | (2006.01) |
| *B01J 20/06* | (2006.01) |
| *B01J 20/28* | (2006.01) |
| *B01J 20/12* | (2006.01) |
| *B01J 20/24* | (2006.01) |
| *B01J 20/20* | (2006.01) |
| *B01J 20/10* | (2006.01) |

(52) U.S. Cl.
CPC ............ *C09K 3/32* (2013.01); *B01J 20/0248* (2013.01); *B01J 20/043* (2013.01); *B01J 20/06* (2013.01); *B01J 20/10* (2013.01); *B01J 20/12* (2013.01); *B01J 20/205* (2013.01); *B01J 20/24* (2013.01); *B01J 20/2804* (2013.01); *B01J 20/28014* (2013.01); *B01J 20/28019* (2013.01); *B01J 20/28033* (2013.01)

(58) Field of Classification Search
CPC ....... C09K 3/32; B01J 20/0248; B01J 20/043; B01J 20/06; B01J 20/10; B01J 20/12; B01J 20/205; B01J 20/24; B01J 20/28014; B01J 20/28019
USPC ......................................................... 502/401
See application file for complete search history.

(56) References Cited

U.S. PATENT DOCUMENTS

| | | | | |
|---|---|---|---|---|
| 4,838,947 A | * | 6/1989 | Levy ..................... | B01J 20/24 134/7 |
| 5,676,660 A | * | 10/1997 | Mukaida ................ | A61F 13/53 604/375 |

* cited by examiner

*Primary Examiner* — Edward M Johnson
(74) *Attorney, Agent, or Firm* — Maxwell L. Minch; Maxwell L Minch Esq. PA

(57) ABSTRACT

The present invention provides for an oil pad having an oil absorbing medium which is formed or compressed to a particular shape. It is intended that such oil absorbing pad can be placed over an oily spill, or in a container containing oil, whereby the formed shape optimizes oil absorption by wicking oil to the interior of the pad, being sufficient to absorb and retain large volumes of oil, or to expand as oil is absorbed to expose one or more potions of the pad to the oil volume to be absorbed. The inventive oil absorbing pad reduces waste, does not create a mess when disposing, and effortlessly absorbs oil from an oily surface.

11 Claims, 3 Drawing Sheets

300

400

EXPANDING AND DISPOSABLE OIL ABSORBENT PADS

CROSS-REFERENCE TO RELATED APPLICATION

This claims priority from U.S. Provisional Application No. 62/519,526, filed Jun. 14, 2017, which is incorporated by reference herein in its entirety

FIELD OF INVENTION

The present invention relates to absorbent pads for oil or grease. More particularly, the present invention relates to oil absorbent pads which expand or unfold as oil is absorbed. The present invention further relates to expanding or unfolding oil absorbent pads which may be disposed of in the trash.

BACKGROUND

It is often encountered when cooking or doing vehicle work that pools of oil exist. As it related to cooking, typically cooking greasy items such as bacon, or frying food items such as chicken, large amounts of oil remain in the bottom of pads. Techniques used to dispose of this remaining oil usually include the use of a can or jar, pouring into a series of garbage bags with a large amount of paper towels, pouring down the drain or otherwise. When pouring such oil down the sink, it can congeal within the pipes of a home, thus needlessly adding to buildup within the pipes. Where such oil is poured into garbage cans, while still in liquid form the oil can seep or perforate through garbage liners, getting the cans oily, and depositing the oil on the bottoms of such cans. In addition, such disposal often takes up much trash space as a result of the number of paper towels typically used.

Likewise, in garages where large pools of oil exist, the methods used to dispose of such oil include cat litter, paper towels or some other absorbent which is poured on to the oily surface, or used to wipe the oily surface. In either method, large amounts of waste is created, as well as, a lot of effort is expended to soak up such oil.

Thus there remains an unmet need for an oil absorbing solution which reduces waste, does not create a mess when disposing, and which effortlessly absorbs oil from an oily surface.

SUMMARY OF INVENTION

The present invention provides for an oil pad having an oil absorbing medium which is formed or compressed to a particular shape. It is intended that such oil absorbing pad can be placed over an oily spill, or in a container containing oil, whereby the formed shape optimizes oil absorption by wicking oil to the interior of the pad, being sufficient to absorb and retain large volumes of oil, or to expand as oil is absorbed to expose one or more potions of the pad to the oil volume to be absorbed. The inventive oil absorbing pad reduces waste, does not create a mess when disposing, and effortlessly absorbs oil from an oily surface.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein:

FIG. 1A illustrates one embodiment where the oil pad is a 100 square oil pad. FIG. 1B illustrates one embodiment where the oil pad is a 200 pillow shaped oil pad. FIG. 1C illustrates one embodiment where the oil pad is a 300 pyramid or triangle shaped pad. FIG. 1D illustrates one embodiment of the inventive oil pad where the oil pad is a 400 cylindrical shaped oil pad.

DETAILED DESCRIPTION

Figure 1A:
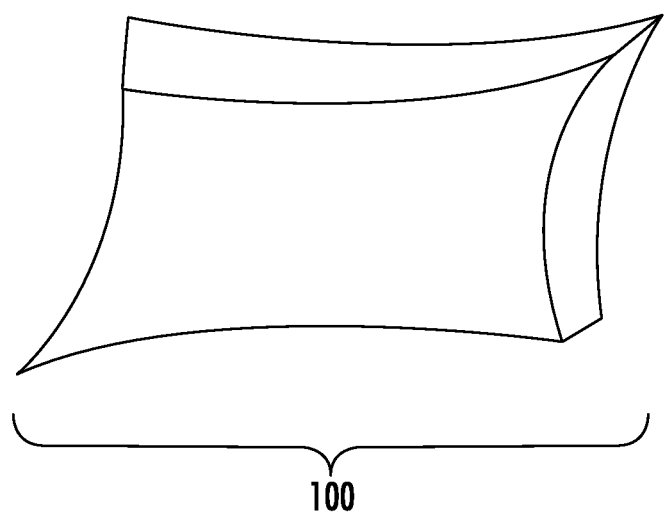
FIGS. 1A-1D illustrate side profile views of several embodiments of the inventive oil absorbent pad.
Figure 1B:
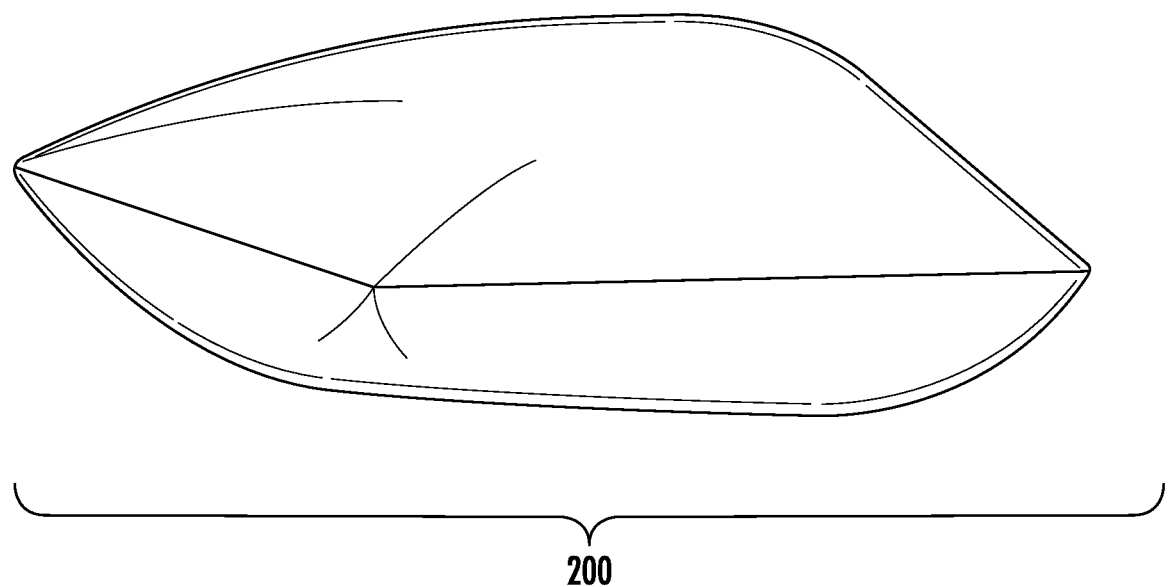

The following detailed description is merely exemplary in nature and is in no way intended to limit the scope of the invention, its application, or uses, which may vary. The invention is described with relation to the non-limiting definitions and terminology included herein. These definitions and terminology are not designed to function as a limitation on the scope or practice of the invention, but are presented for illustrative and descriptive purposes only.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

The present invention provided for an apparatus for absorbing oil which includes an oil absorbing medium formed in a shape forming an oil absorbing pad for placing within an item having oil, wherein the formed shape is a shape optimal for absorbing oil. The purpose of the shape is that a user of the apparatus can place the apparatus into an area containing oil and allowing the oil pad to absorb the oil, where upon absorption of the oil, the apparatus will retain the oil and can be disposed of in the garbage, without creating additional mess, and creating a minimal volume of waste. It is appreciated that upon exposure of the apparatus to a surface containing oil, that the absorbing pad with expand or unfold upon absorption of said oil, thus exposing additional surface area to assist with oil absorption. This is accomplished by exposing unabsorbed regions of the oil absorbing medium or pad to the oil on the surface to be absorbed.

Forming an oil absorbing medium into the inventive oil absorbing pad can be accomplished in many ways known in the art, and nothing herein is intended to limit the forming or compressing the oil absorbing medium. In at least one embodiment, the oil absorbing medium, as described in any embodiment herein, may be formed though compression or vacuum sealing the pad to a specific shape. In some embodiments, the shape is folded and compressed upon itself to form layers of the pad itself in the compressed form. It is appreciated that as the oil absorbing medium absorbs oil the formed shape, as a result of the expansion of the oil absorbing medium, the pad will begin to unfold.

In some embodiments, the oil absorbent medium, or composite layers of oil absorbent medium, are produced in an expanded low density state, and then fixed into a compressed high density state using a polymeric binding system which releases in the presence of oil. When the binder releases, the oil absorbent medium begins to return to its low density opening air voids in the oil absorbent material to help wick and store the absorbed oil. Binders are known in the art, and nothing herein is intended to fix any particular binder. In some embodiments a hydrophobic binder is used in order to prevent water from releasing the binder causing the oil absorbent medium to lose its compressed shape.

In some embodiments, the oil absorbent pad is compressed and encapsulated in a material that requires manual operation to open prior to use, which upon opening a small amount of expansion begins to occur, and is increased only in the presence of an amount of oil as the oil begins to fill the voids in the oil absorbent medium causing it to further expand to its lower density state.

It is appreciated that such oil absorbent pads may be constructed from a woven oil absorbent material that absorbs and holds oil upon being exposed to oil. The inventive pad holds various amounts of oil depending on the intended purpose of the pad. In some embodiments where the pad is intended for kitchen use, the amount of oil absorbing material used is enough to contain and hold 2 tablespoons to ¾ of a cup of oil. Other embodiments should be able to hold amounts of oil up to 1 gallon of oil. It is appreciated that this invention may be adapted to hold any amount of oil, including large amounts of oil, but it is understood that the larger amount of oil that a pad may store the larger the pad will be to dispose. For uses in kitchens and garages, pads should be used that would minimize waste in the respective trash receptacles.

In at least one embodiment the inventive oil absorbing pad includes an oil absorbing material contained within a retaining material for holding the oil absorbing material. It is appreciated that many oil absorbing materials are particulate, thus as a goal of this invention to provide a simple "pillow" or self contained disposal mechanism, certain embodiments may include such particulates that are stored in a porous medium. Such embodiments allow the oil to be exposed to the oil absorbing material through the pores of the retaining material. The oil absorbing material holds the oil.

While it is appreciated that an oil absorbing pad may further absorb other liquids, such as water or paint, in at least one embodiment the oil absorbing medium is hydrophobic so as to only absorb oil, and not absorb water or any other water-based fluids. Many suitable oil absorbing materials are known in the art. In at least one embodiment the oil absorbing material is a hydrophobic or hydrate-phobic material. In certain embodiments the oil absorbing medium is a combination of a non-oil absorbing material and an oil absorbing material. In addition, certain embodiments include an oil absorbing medium that is made up of a non-oil absorbing material containing a filler material that is an oil absorbing material. Suitable oil absorbing materials include, but are not limited to calcium carbonate, aluminum trihydrate, titanium dioxide, wollastonite, kaolin, talc, mica, wood flour, Biodac, nanosponges having carbon nanotubes containing boron, or combinations thereof.

Figure 2:
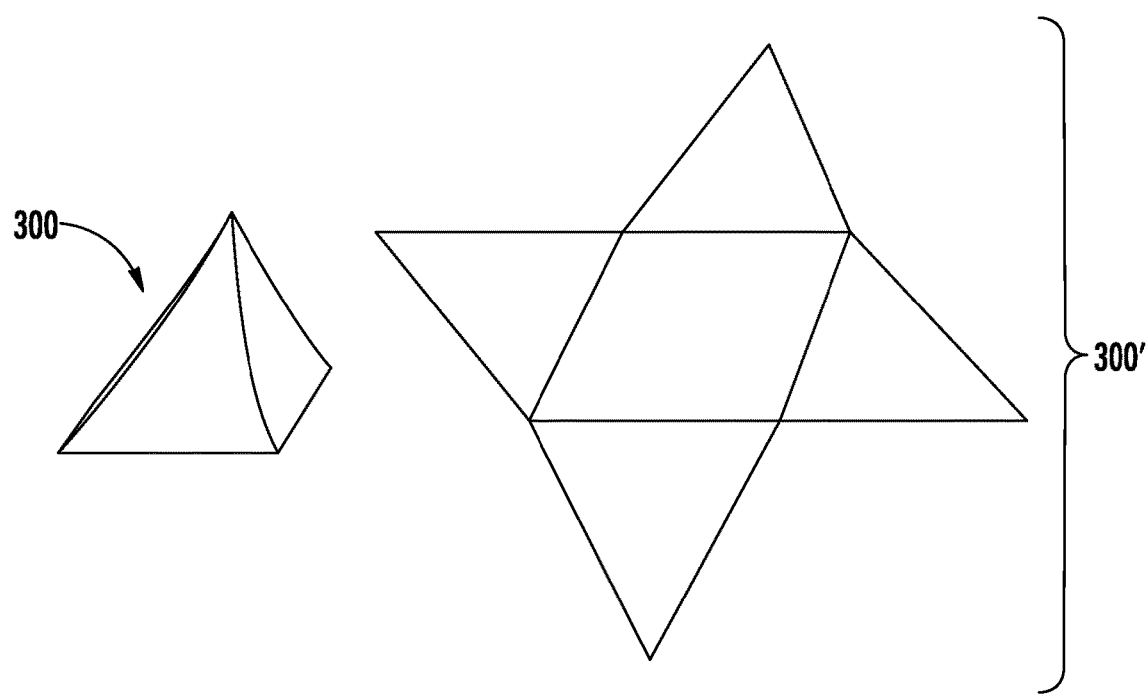
FIG. 2 is a comparison view of the 300 pyramid or triangle shaped pad prior to being exposed to oil, and the 300' expanded pad after being exposed and absorbing oil.
Figure 3:
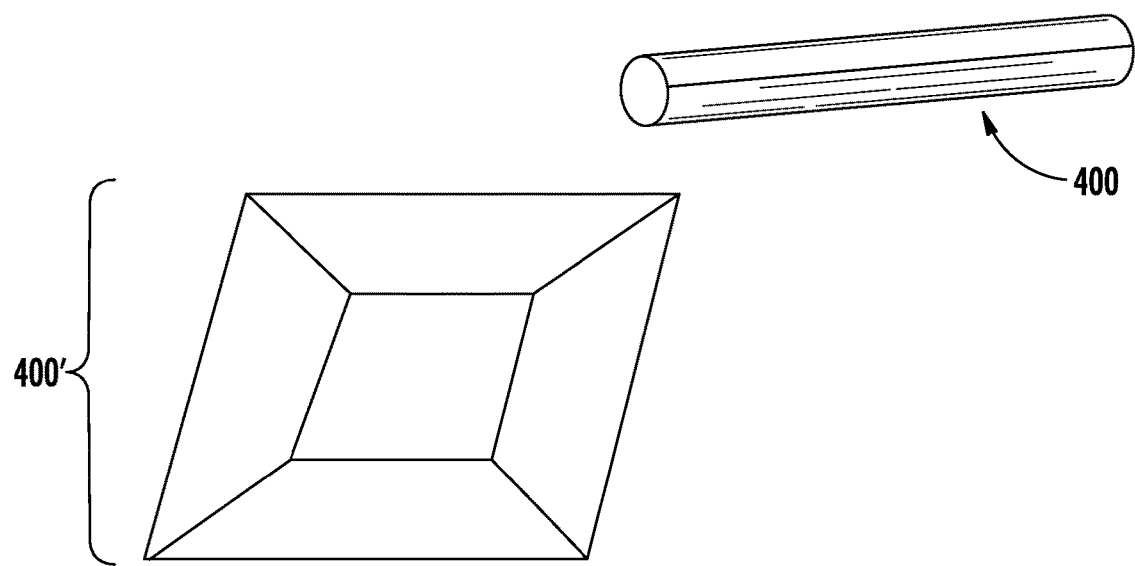
FIG. 3 is a comparison view of the 400 cylindrical shaped pad prior to being exposed to oil, and the 400' expanded pad after being exposed and absorbing oil.

The main advantage of the inventive oil absorbing pad is that the oil absorbing material, or the retaining material and oil absorbing material within, is formed or pressed into shapes prior to being exposed to oil. Such pad may be formed into many shapes such as a sphere, a circle, a cylinder, a triangle, a pyramid, a box, a square, or a rectangle. It is a goal of the invention for the pad to be formed into a shape that allows for optimal oil absorption. Optimizing oil absorption may include larger surface areas, or shapes which can expand as it is exposed to oil, such that new unexposed areas of the inventive pad may be exposed to oil, while increasing the surface area of the pad being exposed to oil. FIGS. 1A-1D illustrate several embodiments of the inventive pad. FIG. 2 and FIG. 3 illustrate certain embodiments before and after being exposed to oil showing the expansion of the pad as the oil absorbing material absorbs oil.

EXAMPLES

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

Exmple 1

Figure 1C:
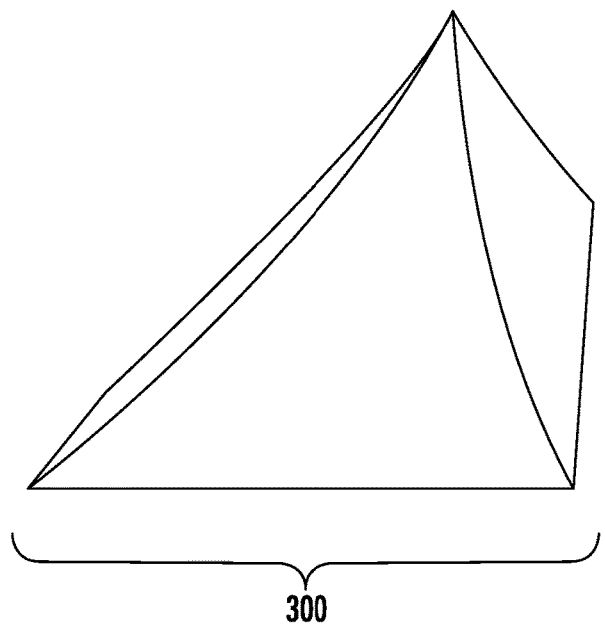
Figure 1D:
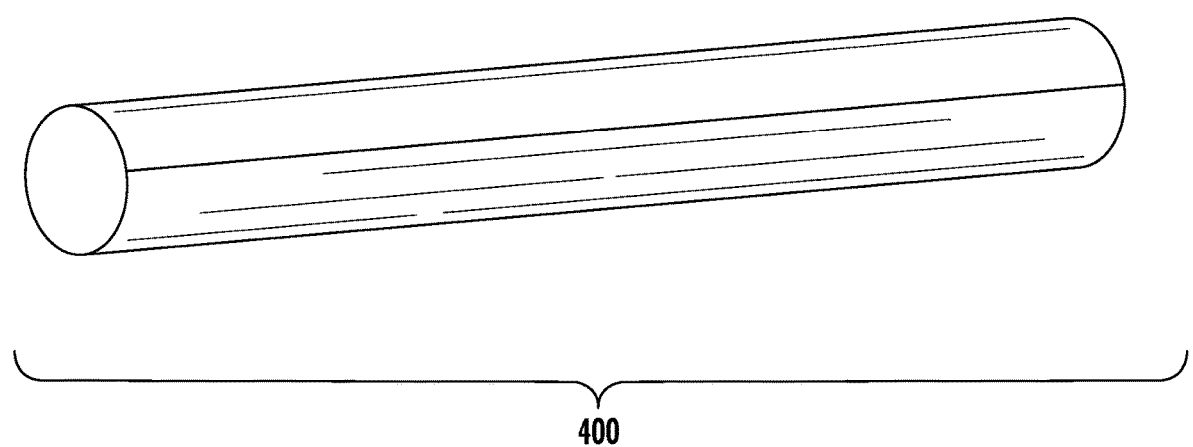

An oil absorbing pad of FIG. 1C or FIG. 1D is used to absorb oil in a kitchen pan after frying chicken. The kitchen pan contains approximately one half cup of oil. The 300, 400 oil absorbing pad is placed in the kitchen pan, and expands as it absorbs oil from the pan. As the pad continues to absorb oil, it 300' 400' expands, exposing new surface area to the oil and allowing for the pad to contain the larger amounts of oil. One a user is satisfied that the oil pad has absorbed the oil, the user removes the pad from the kitchen pan and disposes of the pad containing the oil in the trash receptacle of the kitchen.

OTHER EMBODIMENTS

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

The invention claimed is:

1. An apparatus for absorbing oil, the apparatus comprising:
    an oil absorbing medium formed in a shape forming an oil absorbing pad for placing within an item having oil, wherein said formed shape is a shape optimal for absorbing oil;
    wherein said shape is pressed such that the shape will expand or open to reveal an unexposed surface when exposed to oil; and
    wherein said absorbing pad expands upon absorption of said oil.

2. The apparatus of claim 1 wherein said absorbing pad opens to expose an unabsorbed region of the oil absorbing medium.

3. The apparatus of claim 1 wherein said absorbing pad unfolds to expose an unabsorbed region of the oil absorbing medium.

4. The apparatus of claim 1 wherein said oil absorbing medium further comprises an oil absorbing material.

5. The apparatus of claim 1 wherein said oil absorbing material is a hydrophobic or hydrate phobic material.

6. The apparatus of claim 4 wherein said oil absorbing medium is a combination of a non-oil absorbing material and an oil-absorbing material.

7. The apparatus of claim 4 wherein said oil absorbing medium further comprises a non-oil absorbing material containing a filler comprising of an oil absorbing material.

8. The apparatus of claim 1 wherein said oil absorbing material is calcium carbonate, aluminum trihydrate, titanium dioxide, wollastonite, kaolin, talc, mica, wood flour, Biodac, nanosponges having carbon nanotubes containing boron, or combinations thereof.

9. The apparatus of claim 1 wherein said shape is a sphere, a circle, a cylinder, a triangle, a pyramid, a box, a square, or a rectangle.

10. An apparatus for absorbing oil, the apparatus comprising:
    one or more layers of an oil absorbing medium formed in a shape forming an oil absorbing pad for placing within an item having oil;
    wherein said formed shape is a shape optimal for absorbing oil;
    wherein said oil absorbing material is a hydrophobic or hydrate phobic material; and
    wherein an oil absorbent medium is compressed with a binder which releases in the presence of oil;
    wherein said apparatus is pressed such that the apparatus will expand or open to reveal an unexposed surface when exposed to oil; and
    wherein said apparatus expands upon absorption of said oil.

11. The apparatus of claim 10 wherein said oil absorbent medium expands to greater than twice of the compressed thickness in the presence of oil upon said binder release in the presence of oil, allowing for said oil absorbent medium to create voids to assist with oil retention.

* * * * *